Nov. 15, 1960  A. R. MEYER  2,960,053
WELDING TOOL MANIPULATOR FOR TANK CONSTRUCTION
AND TOOLS FOR THE SAME
Filed Aug. 26, 1954  5 Sheets-Sheet 1
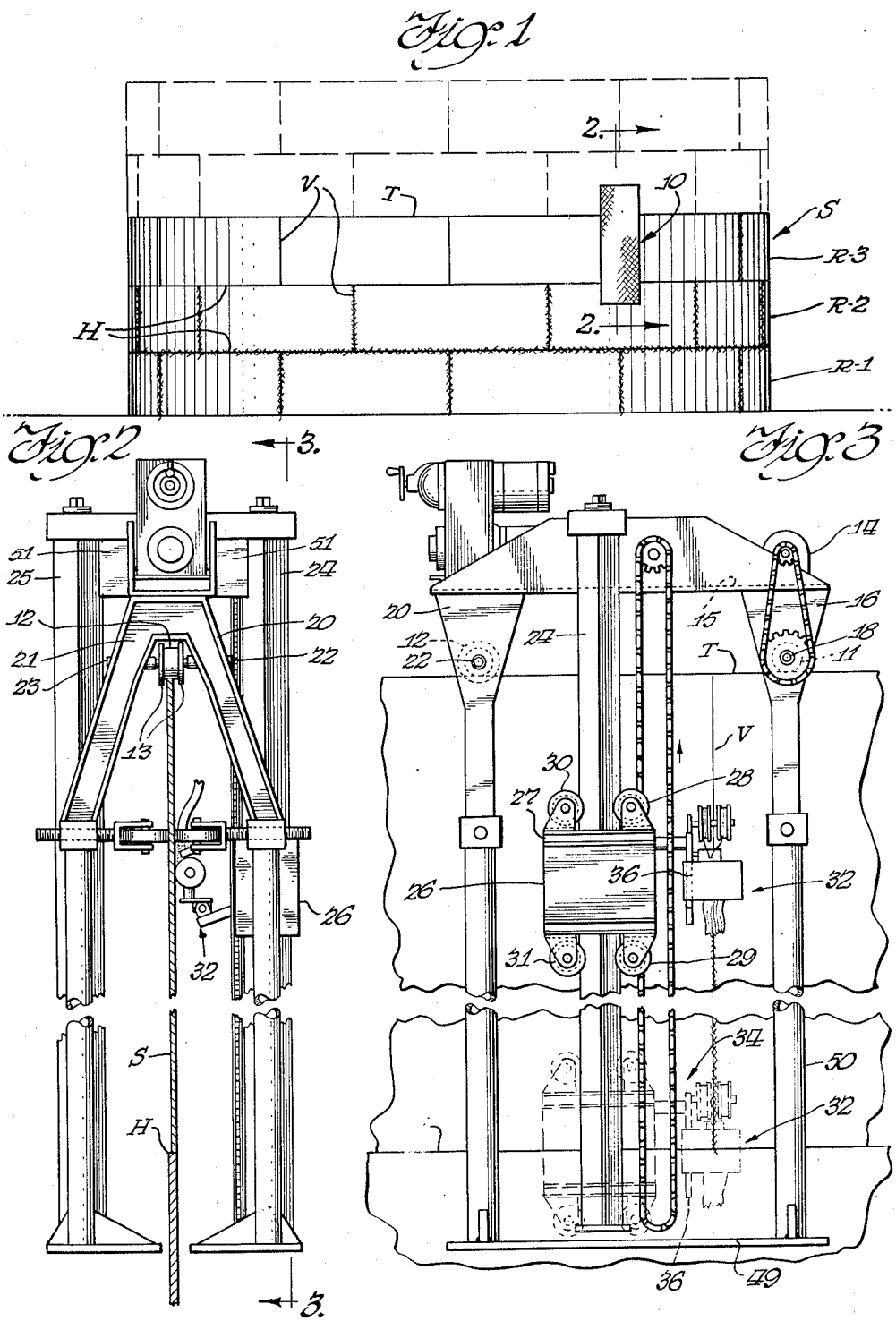

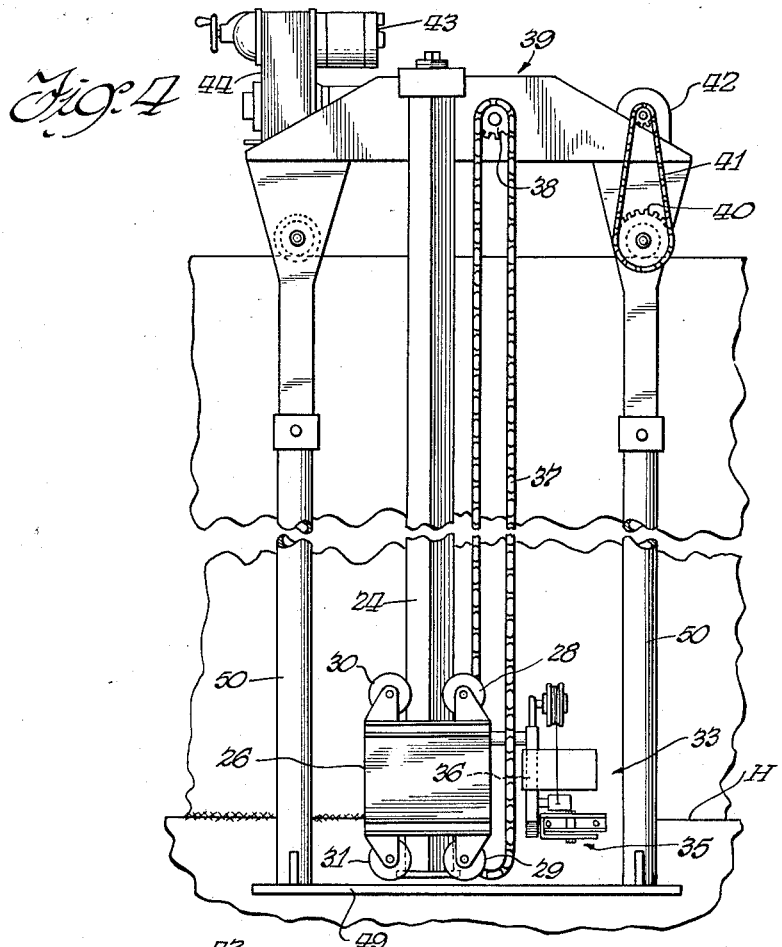
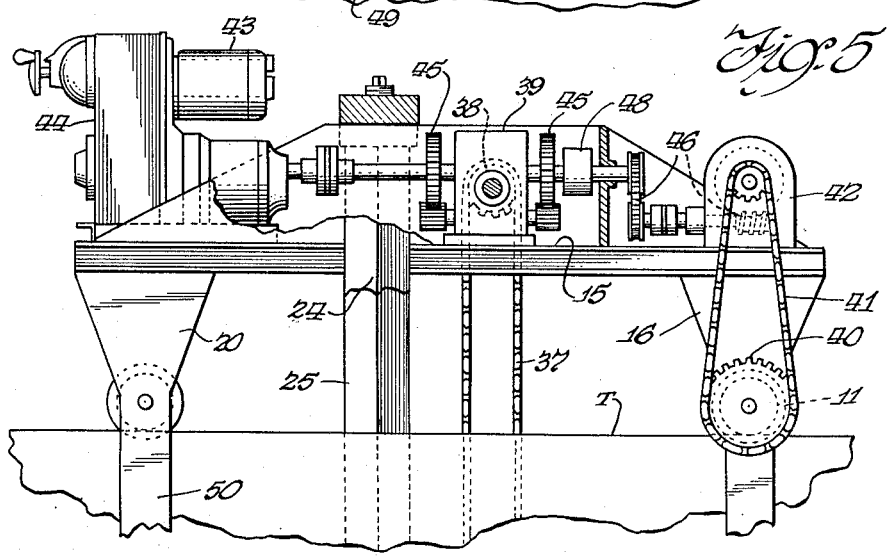

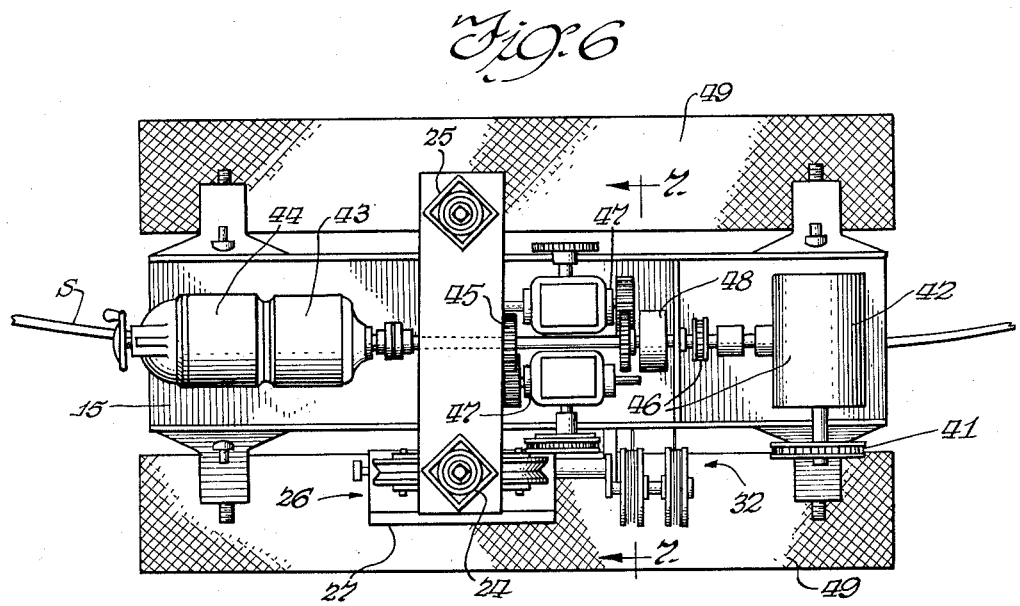
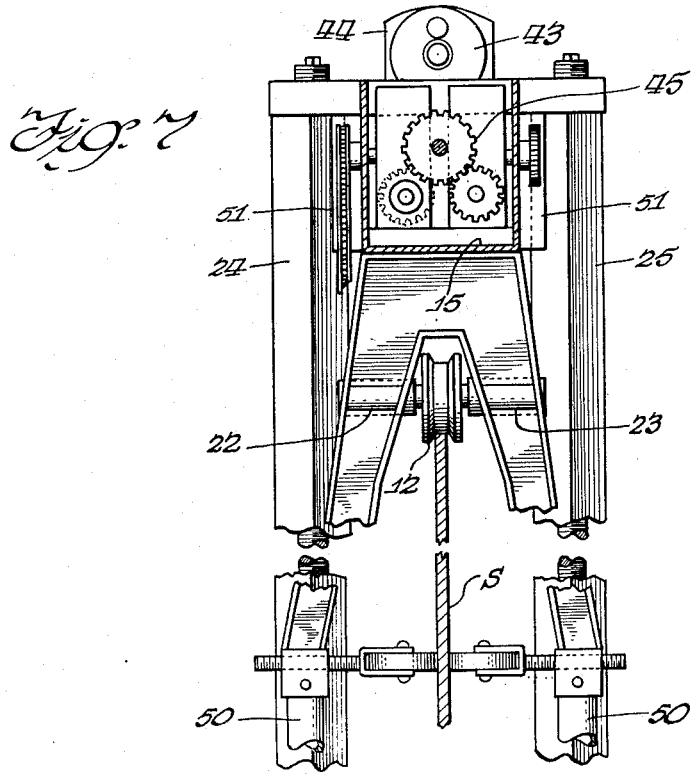

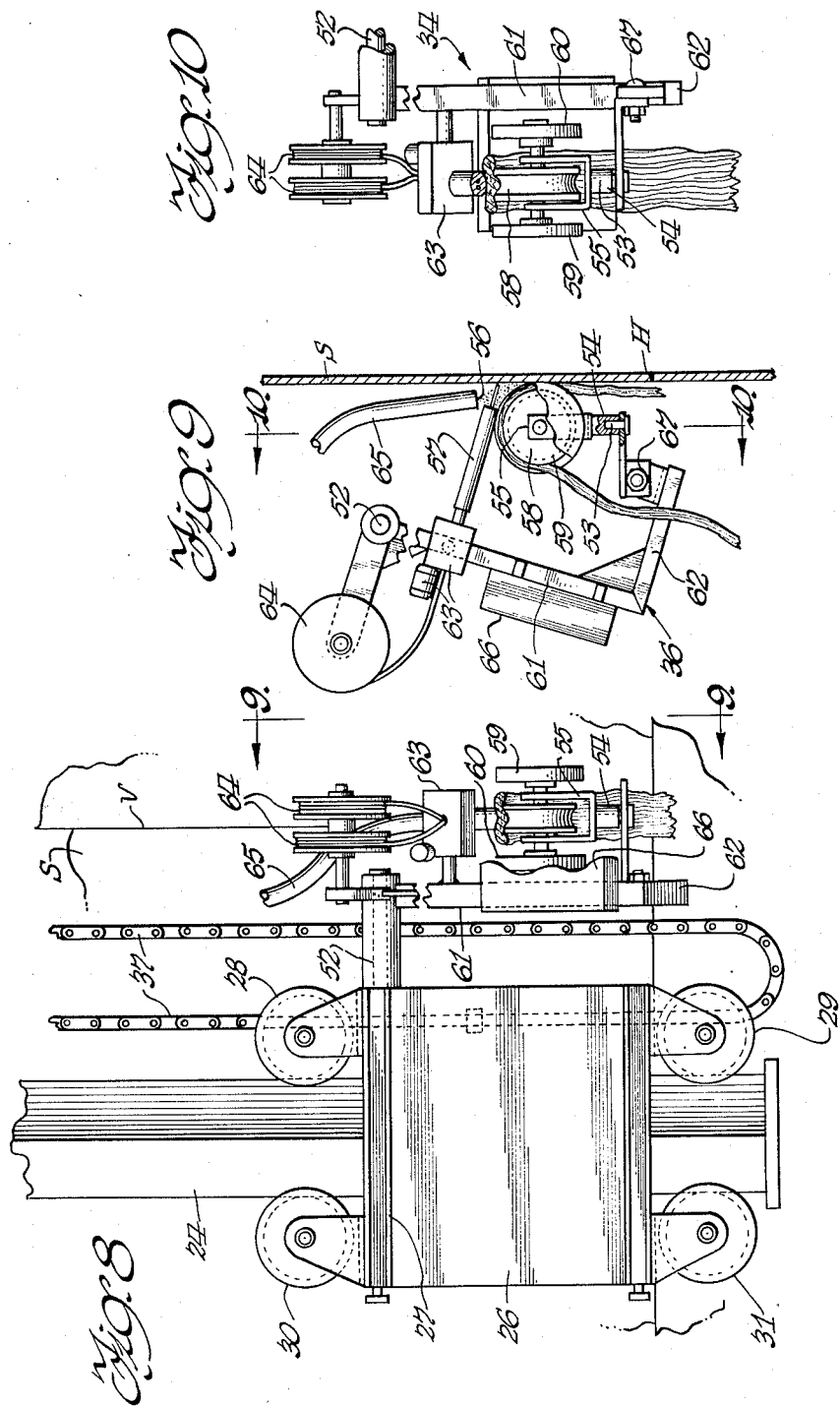

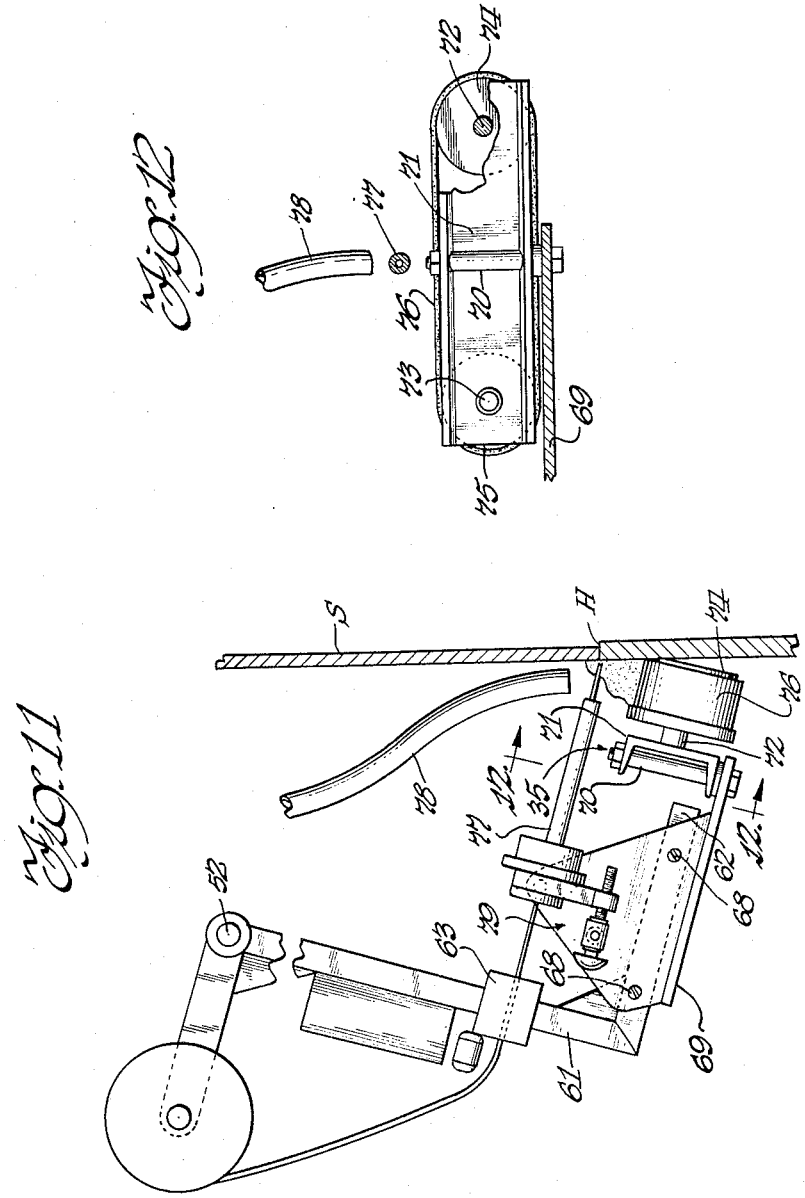

United States Patent Office 2,960,053
Patented Nov. 15, 1960

2,960,053

WELDING TOOL MANIPULATOR FOR TANK CONSTRUCTION AND TOOLS FOR THE SAME

Arnel R. Meyer, Griffith, Ind., assignor, by mesne assignments, to Union Tank Car Company, Chicago, Ill., a corporation of New Jersey Filed Aug. 26, 1954, Ser. No. 452,349

1 Claim. (Cl. 113—134)

This invention relates to a manipulator for tools welding vertical and horizontal seams in the construction of large storage tanks for gasoline, water and the like. The invention can also be considered as relating to welding tools for use on a simple manipulator machine.

It is a primary object of the invention to provide a tool-manipulating machine whereby set-up and operating times, in construction work of this kind, can be minimized.

Another important object is to reduce the total of tooling costs, labor costs, transportation costs, etc. for a complete tank erection crew and its equipment.

A more particular object is so to construct the different parts as to minimize the weight, bulk and cost of the entire manipulating machine and of the tools manipulated. Heretofore, difficulties were encountered in such attempts because of complications and conflicts in the ideal requirements of different parts.

A well-known object is to make it possible and economically efficient to weld both vertical and horizontal seams from either one or both sides of a vertical plate structure, with welding arcs either directly opposite one another or in adjustable leading and trailing positions to one another and with human supervision of a type which is readily available. Again, difficulties were encountered in past attempts to achieve this object.

I have now found it possible to overcome these and other problems.

The solution lies partly in the use of a supporting carriage platform, raised a slight distance above the top edge of the tank plate structure whereon the carriage rolls. By means of this feature operating room is created for required vertical welding equipment and operations, without significant unbalancing of the carriage.

Another part of the solution lies in the use of certain universal joint means connecting the welding tools with lower parts of the carriage, whereby both tools and carriage can be constructed and operated in very simple manner.

These and other features will now be described in greater detail, as incorporated in a preferred embodiment of this invention.

In the drawing:

Figure 1 is an elevation of a tank under construction by apparatus in accordance with this invention.

Figure 2 is a somewhat enlarged section through the apparatus of Figure 1, the section being taken along the lines 2—2 in that figure.

Figure 3 is a front elevation of the apparatus of Figure 2, manipulating a vertical welding tool.

Figure 4 is a view generally similar to Figure 3 but wherein the machine manipulates a horizontal welding tool.

Figure 5 is a more enlarged front elevation of the upper or carriage part of the machine and parts mounted thereon.

Figure 6 is a plan view of the apparatus of Figure 5.

Figure 7 is a fragmentary end view of the apparatus of Figures 5 and 6.

Figure 8 is a front view of the lower part of the machine of Figure 5 with the vertical welding tool thereon.

Figure 9 is an end view of the apparatus of Figure 8.

Figure 10 shows the tool of Figure 9 in a view taken along lines 10—10 in that figure.

Figure 11 is a view generally similar to Figure 9 but showing the horizontal welding tool.

Figure 12 shows the tool of Figure 11 in a view taken along lines 12—12 in that figure.

Referring first to Figure 1:

The entire welding work required for the construction of the tank shell S (except the preliminary, manual tack welding forming part of the plate fit-up job and conventionally performed by semi-skilled or unskilled welders) is effected with and substantially by a single manipulator 10. This machine deposits first the vertical weld seams V of each plate ring R-1, etc. by means of the vertical welding tool of Figures 9, 10. It then deposits the horizontal weld seam H at the bottom of the same plate ring by means of the horizontal welding tool of Figures 11, 12. Thereafter the machine can be set up on the next higher plate ring, meanwhile fitted up at least in part, for similar work.

According to the drawing, a first ring R-1 of shell plates has been completed. A second ring R-2 has been superimposed thereon. The plates of this second ring have been interconnected by vertical weld seams V and secured to the first ring by a continuous horizontal weld seam H. A complete, third ring of shell plates R-3 has been superimposed on the second. The horizontally successive plates P-1, P-2, etc. of the third ring have been installed and temporarily secured by tack welding. The manipulator 10 has made some of the vertical seams V of the third ring, shown at right. The manipulator is in position for making another vertical seam. It is here shown as protected by a canvas weather cover. This cover has been removed in the other views.

Referring now to Figures 2, 3 and 4:

In order to allow automatic horizontal welding and positioning for vertical welding the manipulator 10 comprises a pair of wheels 11, 12 resting on the top edge T of the uppermost plate ring R-3 and prevented from slipping down therefrom by flanges 13. Wheel 11 is driven by a drive mechanism, generally shown at 14. This mechanism is mounted on a rigid platform 15, as usual for motors and the like, providing convenient access to the different parts for oiling and other maintenance operations. The platform 15 has rigid side plates 16, 17 which respectively hold aligned bearings 18, 19 for the axle of the drive wheel 11. It has rigid side plates 20, 21 similarly holding bearings 22, 23 for the idler wheel 12.

The welding is done below the platform 15. In order to allow upward completion of vertical welds V, as will be described, the platform is held a certain distance above the top edge T. Therefore the side plates 16, 17, 20 and 21 form legs extending upwards from the wheels 11, 12 to the platform. On the other hand a pair of elongated vertical guide track structures 24, 25 for the welding tools extend downward from the platform. They extend on the outside and inside of the shell S respectively and are mounted on the platform at points between the ends of the latter. These guide tracks 24, 25 are rigid by themselves and are rigidly secured to the platform in order to insure mounting stability for plate-contacting parts of the travelling welding tools in spite of the great vertical overhang between the platform and the tools.

Each guide track may have movably or adjustably mounted thereon an adaptor 26 for the support of the welding tools (only one adaptor is shown). The adaptor 26 travels upwardly in vertical welding and may therefore be called an elevator. It has close but movable fit with the track 24. For this purpose it may comprise a rigid frame 27 having a pair of top and bottom wheels 28, 29 engaging one side of the track 24 and a similar pair of wheels 30, 31 engaging the other side.

Referring now to Figures 3 and 4:

The adaptor 26 serves to support either a vertical welding tool 32 or a horizontal welding tool 33; either kind of tool being adapted to allow submerged arc welding in the so-called three o'clock or nine o'clock positions and to insure the production of sound, elongated welding seams in spite of economically unavoidable irregularities of plate formation, heat input, electrode and flux melting, etc. A horizontal tool of this kind has been disclosed in my Patent No. 2,638,524 and a vertical tool of such kind has been disclosed in Patents 2,673,916 and 2,677,036 issued respectively to myself and to myself and another.

I found it practically necessary both in horizontal and vertical welding with the present type of manipulator to interpose what may be called a double joint structure between the welding tools and their support 26, enabling the tools to pivot slightly in two planes but preventing them from pivoting in a third plane. Pivoting is necessary in vertical and horizontal planes substantially normal to the shell plates to be welded. Pivoting is undesirable in a plane substantially parallel to the plates.

The latter requirement, against pivoting in a parallel plane, arises from the need for parallelism between the seam and the axis of the tool, the latter comprising a plurality of aligned elements such as a flux support belt and an electrode nozzle.

The requirement for slight pivoting in planes normal to the shell is connected with practical features of the shell plates and of the manipulator carriage, both of which are apt to interfere with desirable alignment between tool portions and shell surface portions. Misalignment in either of said planes can occur for instance because of bends, bumps, shrinkage distortions and other irregularities in the shell plates or their surfaces. Misalignment in a horizontal plane can occur also because of variable engagement between the carriage roller flanges 13 and the top edge T. Misalignment in a vertical plane normal to the shell can occur also because of variations in the weight loading of the inner and outer parts of the machine, which can be caused mainly by the weight of electric supply cables.

It is practically impossible to avoid or even foresee all causes of misalignment, except those affecting the vital parallelism between seam and tool axis. On the other hand it is very undesirable from the standpoint of sound welding with available tool devices to let any misalignments affect the relation between the tool and the adjacent plate surface. The double tool joints 34, 35 provided in accordance herewith for the vertical and horizontal tools respectively, serve to maintain this relation. This involves the provision of some little bulk in the tools and tool supports, which in turn require the elevated platform construction as described.

In the construction as shown, one swinging frame 36, suspended from the adaptor 26, forms part of either universal joint 34, 35. Other parts of each universal joint, 34 or 35, are constructed in slightly different manner; they can also be considered as parts of the respective tools. The use of pivoted double joints is preferred over that of equivalent mechanical units because pivots or journals are most easily kept in their required, freely movable condition, in the presence of wind-carried flux powder, dust and like materials occurring at the construction site.

In order to effect the necessary vertical travel of the vertical tools 32 each tool adaptor and double joint carrier 26 is suspended on a hoisting chain 37. The chain desirably forms an endless loop and is supported as well as driven by a sprocket 38 on the output shaft of a hoist 39 on the carriage platform 15. In order to propel the horizontal welding tool 33, the power drive 14 is provided on the platform 15. It comprises a sprocket 40 on the shaft of the drive wheel, a chain 41 for said sprocket and a drive 42 for said chain. In the interest of stability as well as economy, a single prime mover 43 is provided for the hoist 39 and drive 42. It has an adjustable speed reducer 44.

Referring to Figures 5, 6 and 7, the speed reducer 44 is connected with the hoists 39 by one set of speed reducing units 45 and with the drive 42 by another speed reducing unit 46. Either speed reducing unit 45 or 46 can be driven by the motor reducer 43, 44, by means of suitable clutches 47, 48. In order to allow simultaneous starting and stopping of the pair of vertical tool hoists 49, the hoist clutches 47 are desirably of the electromagnetic type. The travel or drive clutch 48 may be either electric or manual. Preferably a high ratio of speed reduction such as 1:60 is provided in the hoist speed reducer 45 and a relatively low ratio such as 1:10 in the travel speed reducer 46. The reason is that horizontal beads can be deposited more rapidly than vertical ones. For details in this respect reference may be had to my Patents 2,638,524 and 2,673,916. The adjustment of vertical and horizontal travel speed as well as other variables, can usually be made once for all, at least for any one type of tank construction job, on the common speed reducer 44. However, if need be it can be varied, along with other variables, by one of the operators who ride along with the machine on a platform 49, supported from the carriage by a frame work 50 (see Figures 3, 4).

Referring now particularly to Figure 7, some appreciable distance exists between each guide track 24, 25 and the corresponding surface of the vertical shell plate S to be welded. Some of this distance is required for the horizontal progress of the machine, in view of various curvatures of the vertical shell plates. Additional distance is desirably provided between these guide tracks in order to facilitate their rigid attachment to the platform 15 by structural reinforcements 51, and also to provide suitable room for the hoist, drive and motor machinery 39, 42, 43, 44, 45, 47, 48.

The reinforcements 51 extend some distance along the guide tracks 24, 25. In order that such reinforcements may not interfere with the upward travel of the elevators 26 the reinforcement structures are secured to the surface of the guide track facing the platform 15 whereas the elevator wheels engage guide track surfaces laterally therefrom. Thus it becomes possible for upper parts of each elevator to travel upwards beyond the elevation of the platform 15; thereby facilitating the upward completion of a vertical weld V with relatively minor elevation of the platform 15.

Referring now to Figures 8, 9 and 10:

The double joint 34 for the vertical tool 32 is formed in part by the swinging frame 36 as mentioned; this frame being suspended from and swingable about a shaft or bearing member 52 which is rigidly secured to the elevator 26 and extends horizontally and substantially parallel to the shell S. The other part of this double joint is formed by a substantially vertical pin or pivot member 53 secured to a lower part of the frame 36 adjacent the plate S. A sleeve 54 rotatably held on this pin 53 is rigidly secured to the frame 55 of the tool.

This frame in turn holds an uppermost flux nozzle 56, an electrode nozzle 57 therebelow, and a flux supporting means or belt roller unit 58 for the support of the flux and control of the melt as known from the aforementioned Patents 2,673,916 and 2,677,036. The frame 55 and parts thereon are kept properly oriented relative to the adjoining plate surface, in a flat or horizontal plane, by guide roller means 59, 60. Desirably such rollers are mounted on the same shaft with the belt roller 58 and all of them are in the nature of idlers. As a result they do not interfere with the starting of the vertical welding process at a low point adjacent the ground, in the construction of the first ring R–1 of plates; nor will the machinery run off from the shell plate S at the top edge T, or require the attachment of any temporary run-off plates as used for some time in the past.

The swinging frame 36 is shown as being substantially L-shaped in side view. It has a portion 61 extending downwardly from the horizontal pivot 52 and away from the plate S. Another, relatively flat portion 62 of the frame extends from the bottom end of part 61 toward the plate S. The reason is that the tool 32 must be held toward the plate; it cannot be allowed to swing away from the same due to its own weight. (This would tend to happen if there were only a direct connection between the tool and the pivot 52, the latter being relatively far from the plate for the reasons as mentioned above.) To counterbalance this tendency a reverse turning moment is produced by the portion 61 and the additional parts mounted thereon to force the tool into contact with the plate. These parts include mainly the required welding head 63, electrode reel or reels 64, flux supply means 65 and control instrument cabinet 66. Those parts may all be mounted on the frame portion 61 and functionally interconnected in manner known to the art which need not be described herein. They can be located so as not to add to the headroom required under the platform 15.

The vertical pin 53 of the vertical tool joint assembly can be removed from the flat portion 62 of the swinging frame 36, by loosening bolt means 67, when the time arrives for horizontal welding.

Referring now to Figures 11 and 12:

The frame portion 62 can support, by bolts 68 and an adaptor plate 69, another more or less vertical pin 70 whereon a horizontal tool frame 71 is swingable in a flat plane.

Symmetrically arranged on both sides of the pin 70 and as shown, forwardly extending from the horizontal tool frame 71, there a flux supporting means comprising two roller axles 72, 73, supporting respectively end rollers 74, 75 about which is located a flat, plain endless belt 76. This belt may serve as flux support for the horizontal welding tool, with the aid of further mechanism as disclosed in my Patent 2,638,524. The working edge of the belt, between the end rollers, is kept accurately in line with the plate surface. For the horizontal electrode nozzle 77 directly above the belt 76 and the flux nozzle 78 laterally adjacent the electrode it is unnecessary, at least in the present case, to provide a fine adjustment in a horizontal plane. Therefore, as shown, they do not participate in the horizontal swing of the belt frame 71. It is however important that the horizontal welding electrode be adjusted very accurately to the elevation of the seam to be welded. Adjustment means 79 for this purpose may be provided on the tool frame 69 as shown.

*Relative dimensions of tools and frames*

A fundamental factor of design calculation for the present type of machine is the maximum thickness $t$ of the shell plates S to be welded. The roller 58 of the vertical tool must have a diameter $ta$ which is largely dependent on said thickness. The multiplier $a$ can be found experimentally. In the best machines presently available it is about 3; that is, a roller of about 3 inch diameter is used for work on plates up to 1 inch thickness. The detailed considerations entering these calculations are quite complex, as explained in said earlier patents. For present purposes the facts stated will suffice.

The thickness of the glass wool belt, the height of the electrode and flux nozzles and the height of the pin 53, supporting the weight of the basic portions of tool 32, add further height $b$ to the tool. Therefore the overall height $t$ $a+b$ of the tool is likely to be at least 6 to 9 inches and frequently more.

Therefore a clearance of at least about 1 foot is required between the platform 15 and the plate edge T. This raises the center of gravity of the machinery on the platform by 6 to 9 inches above the elevation that could otherwise be used. Such raising of the center of gravity is not very desirable by itself. However, sufficient counterbalancing is practically provided, for perfect stability of the entire machine, by the bulk of the rigid guide tracks 24, 25, the machinery thereon, the operator's platform and support thereof. The downward extension of the rigid guide tracks 24, 25 is at least 4 to 6 feet in all cases and frequently 8 or more feet. Thus it is unnecessary to load the lower parts of the machine beyond their inherently required weight.

Particularly, it is possible to make the swinging frames or double joint members 36 relatively small, low and light; more so than is shown in my Patent 2,638,524. They only must provide room for the tools 32, 33 and the additional equipment to be mounted on the frame 36 for swinging balance and convenience, such as the parts 63, 64, 65 and 66. A height of 1 to 2 feet is frequently sufficient for such a frame 36. In its upper position in vertical welding, the pivot 52, as mentioned, can be raised above the platform 15; the L-shaped frame will still support the tool 32 below the frame.

*Operation*

At the start of its operation, the manipulator 10 is hoisted upon the top edge T, connected to suitable sources of motive power and welding current, loaded with proper welding electrode and flux materials, and brought to the first vertical seam V to be welded.

At such position it is usually desirable to test the guide tracks 24, 25 for accurate parallelism with the seam, in the plane parallel with the shell wherein no automatic pivoting adjustment is provided. Lack of required parallelism may occur due to irregularities of top edge T. Proper compensating measures can then be taken. The tools 32 on one or both sides, with or without lead ahead of one another, are then brought to the starting point of upward travel and the vertical welding begins.

During such welding the travel clutch 48 is disengaged; the hoist clutches 47 are engaged. Both elevators 26 are raised along their guide tracks at uniform and constant velocities. The welding heads 63 on one or both sides are operated, either simultaneously or otherwise, depending on the types of electrode and heat input required on each side. Flux material from the nozzles 56 and flux supporting, melt controlling belt material over the rollers 58 can always be supplied in substantially uniform manners on both sides. As the tools operate in this manner they deposit upwardly rising columns of melt in the vertical seam or groove V, keeping the liquid metal in position until it congeals. Liquid flux is upwardly and laterally displaced to a large extent.

During its upward travel the tool 32 may from time to time run over more or less irregularly shaped plate surface areas; or the orientation of its supporting carriage, in a vertical plane normal to the shell, may change because of movements of the operator or the like. In spite of such interference the universal joint 34 and guide rollers 59, 60 keep the tool 32 properly oriented with regard to the plate areas adjacent the seam V. This is very important in view of the extremely delicate nature of some of the operations, such as the maintenance of proper orientation of the electrode relative to the seam and the distribution of pressure in the flux support belt. Variation of such factors, due to misalignment, would tend to spoil the deposited melt bead, directly and/or indirectly; for instance by causing momentary, jerky motion of the flux belt and consequent disruption of the stationary flux bed at the welding site.

The vertical welding operation is repeated at each vertical seam V until all vertical seams of the ring of plates have been completed.

Thereafter the bolts 67 are loosened; the vertical tool unit 53, 54, 55 is removed; the swinging frame 36, welding head 63 and cooperating parts 65, 66, etc. are left in place. A new electrode reel 64 suitable for horizontal welding is then installed; the electrode is properly fed into and through the welding head 63 and a horizontal tool adaptor 69 is installed by bolts 68. The horizontal electrode nozzle 77 is properly adjusted to the horizontal seam H to be welded; a coarse adjustment being provided by the adaptor 26 and a finer adjustment by the set screw 79.

Horizontal welding can then be started at any desired point of the horizontal seam. For this purpose the hoist clutch or clutches 47 are disengaged and the travel clutch 48 is engaged. The machine moves forward on the top edge T, propelling the flux belt 76 and electrode and flux nozzles 77, 78 along the seam H, while welding current, electrode wire and flux are supplied. This operation can continue on one or both sides of the plate, until the horizontal welding tool or tools 33 have returned to their respective starting points. Alignment is maintained by the double joint 35, as previously by double joint 34.

Each plate ring can thus be completed by means of a single machine and a single operative set-up thereof, aside from minor adjustments at the tool end and drive ends. The changeover from vertical to horizontal welding can be achieved in about a minute or two. The entire machine, which is desirably shipped in knockeddown or collapsed condition, can be set up by two men in about one hour.

The welding with the machine, both vertically and horizontally, can be performed by one and the same operator, who need not be highly skilled in weld rod manipulation and similar techniques. He must only be able to supervise the simple mechanism and instrumentation provided hereunder.

Two semi-skilled operators will usually ride with the machine, one on each side. They have a production capacity, by means of the machine, equal to that of about eight highly skilled manual welders on horizontal welds and equal to that of about four highly skilled manual welders on vertical welds; always after allowance for unpacking and setting up the machine.

I claim:

In a welding manipulating apparatus used to weld vertical and horizontal seams on juxtaposed vertically upstanding plates, a combination of a carriage, rolling means to carry the carriage in a direction parallel to the horizontal seams, said rolling means being arranged to engage a horizontal edge of one of said plates, guide means secured to the carriage and depending therefrom alongside said plates, a housing carried by the guide means and movable vertically thereon, drive means operatively connected to the housing and arranged to move said housing in a vertical direction on said guide means, a first pivot connected to the housing and providing an axis substantially parallel to said horizontal seam, welding tool supporting frame means carried by the first pivot for demountably and selectively positioning a vertical welding tool or a horizontal welding tool in operative welding position adjacent the vertical and horizontal seams, respectively, second pivot means connected to the frame means and providing an axis substantially perpendicular to said horizontal seams, flux supporting means carried by said second pivot means for coacting with the vertical welding tool or the horizontal welding tool, said frame means being so configured and the welding tools being so located on said frame means that the frame means is urged to move around said first pivot in such a direction as to bias said tools including said flux supporting means toward and into engagement with said plates even under changing attitudes of said apparatus, power means on the carriage, and means to selectively engage the power means with the drive means and rolling means to selectively move said housing vertically on said guide means and move the apparatus horizontally on said plates.

References Cited in the file of this patent

UNITED STATES PATENTS

| | | |
|---|---|---|
| 1,491,902 | Coble | Apr. 29, 1924 |
| 1,560,699 | Kramer | Nov. 10, 1925 |
| 1,740,033 | Pinckney | Dec. 17, 1929 |
| 1,821,410 | Taylor | Sept. 1, 1931 |
| 2,221,187 | Gunn et al. | Nov. 12, 1940 |
| 2,638,524 | Meyer | May 12, 1953 |
| 2,737,565 | Meyer | Mar. 6, 1956 |
| 2,781,441 | Ballentine et al. | Feb. 12, 1957 |

FOREIGN PATENTS

| | | |
|---|---|---|
| 704,963 | Great Britain | Mar. 3, 1954 |